United States Patent [19]

Delcoigne et al.

[11] 4,288,263
[45] Sep. 8, 1981

[54] PROCESS FOR MAKING PLASTER BOARD

[75] Inventors: Adrien Delcoigne, Chantilly; Jacques Lanneau, Breuil-le-Vert, both of France

[73] Assignee: Saint Gobain Industries, Neuilly, France

[21] Appl. No.: 3,414

[22] Filed: Jan. 15, 1979

[30] Foreign Application Priority Data

Feb. 8, 1978 [FR] France .................. 78 03473
Feb. 8, 1978 [FR] France .................. 78 03474
Feb. 8, 1978 [FR] France .................. 78 03475

[51] Int. Cl.³ .................. B32B 13/04; B32B 13/14
[52] U.S. Cl. .................. 156/42; 141/1; 156/39; 264/257; 366/108; 428/255; 428/432; 428/703
[58] Field of Search .................. 428/70, 71, 538, 255; 156/39, 42, 346; 264/69, 71, 70; 106/85; 52/443; 366/34, 40, 108; 141/1, 69, 78

[56] References Cited

U.S. PATENT DOCUMENTS

| | | | |
|---|---|---|---|
| 1,489,693 | 4/1924 | Brookby | 156/39 |
| 1,610,627 | 12/1926 | Spires | 156/39 |
| 1,702,730 | 2/1929 | Hite | 428/309 |
| 1,880,188 | 9/1932 | Robinson et al. | 156/39 |
| 1,908,658 | 5/1933 | Dean | 156/39 |
| 1,945,306 | 1/1934 | Dean | 156/39 |
| 3,532,576 | 10/1970 | Proctor et al. | 156/39 |
| 4,065,597 | 12/1977 | Gillespie | 156/42 |

FOREIGN PATENT DOCUMENTS 350771 4/1928 Belgium .

*Primary Examiner*—Paul J. Thibodeau
*Attorney, Agent, or Firm*—Harding, Earley & Follmer

[57] ABSTRACT

The present invention is concerned with manufacturing board from a fluid evolutive product, such as a plaster and water mixture. The process comprises pouring upon a conveyor a fluid evolutive product, such as a plaster and water mixture, contained in storage above the conveyor, through a transverse, parallel slit into which the product is introduced in continuous process through a number of nozzles which discharge into the storage product mass. A reinforcement may be introduced into the poured product. The invention offers as well mechanism for the implementation of the process and products manufactured by the process. Typically the invention is applied to plaster board manufacturing.

27 Claims, 20 Drawing Figures

PROCESS FOR MAKING PLASTER BOARD

TECHNICAL FIELD

This invention is in the field of forming solid products from a fluid evolutive product.

BACKGROUND OF PRIOR ART

A fluid evolutive product is a liquid in which a reaction resulting in a physical or chemical transformation takes place such as producing a solid phase or modifying the characteristics of a solid phase initially carried by the liquid.

The present invention is concerned with manufacturing of board by pouring, upon a moving conveyor, a fluid evolutive product. Plaster powder and water mixture is exemplary of such a product. As soon as plaster powder is mixed with water, it starts evolving rapidly until it sets completely. Continuous process manufacturing of plaster building components demands a control of the plaster reacting stage at each moment and at all stages of mixing, from the initial supplying of pulverized plaster powder and water up to the end of line where completed building components are ready to be used.

When an evolutive product has a pasty consistency, the way to control its evolution inside a tooth type mixer is known, and the way to spread it in continuous process upon a moving conveyor having a conveyor belt in order to form a more or less even plaster strip which may be put into forms in a continuous process is known. But working with a paste necessitates heavy equipment since the cohesive forces to be overcome are important, and paste flow rate regulation and paste level measurement are far from accurate. Hence there is unevenness in the amount of the product supplied to the moving conveyor and consequently unevenness in the finished product quality.

When the evolutive product has a liquid consistency, as in the case of plaster, the only way known to use it for the manufacturing of building components is in a non-continuous process. It is poured into molds where it is left until the plaster sets. Up to now, a liquid plaster mixture is not used in a continuous process, partly owing to the difficulty encountered in holding liquid plaster by a valve during its mixing inside a standard mixer without the mass setting of deposits at the level of the narrow channel created by the valve, and partly also owing to the difficulty encountered in keeping an evolutive product such as plaster in a continuous process pouring facility without any premature mass setting of the plaster inside the facility. The applicants are the first to develop the flow rate regulating of a plaster fluid mixture coming out of a mixer. In this connection reference may be had to our copending applications entitled "Process and Mechanism for Evolutive Pulp Flow Regulation" U.S. Patent application Ser. No. 3,416, and "Continuous Process Mixing of Pulverized Solids and Liquids and Mixing Apparatus", U.S. Patent application Ser. No. 3,415, filed concurrently herewith on Jan. 15, 1979 and incorporated herein by reference.

Being able to control the time of stay of a fluid evolutive product in a mixer, such as a liquid plaster powder and water mixture, through runoff flow rate regulation of said mixture coming out of the mixer, applicants then sought the use in continuous process of such a liquid mixture for building panel manufacturing in such a way as to make use of the advantages inherent in the use of a liquid, i.e., level detection accuracy, more even spreading of mixture and lighter equipment.

The way to pour out a product upon a moving bed, and to let it spread out by itself is known, the thickness of plates thus manufactured being a function of bed running speed. But when working with a fluid evolutive product, it is difficult to control its spreading and difficulties are encountered in thick plate manufacturing. In order to limit and control spreading, it is possible to consider making use of devices habitually relied upon to pour non-evolutive products. They generally comprise a bottomless container placed above a moving conveyor with a slit formed by said conveyor and by the lower edge of the plate which forms the downstream wall of the container.

The container is filled with product, thus creating a storage load above the conveyor and the product runs off on the conveyor through the slit at the base of the container. If a plaster powder and water mixture were poured in such a device, it would set, first along the container's walls and then on the slit edges and the pouring facility would soon become blocked up.

The board manufacturing process involving pouring upon a moving conveyor an evolutive fluid product, such as a plaster powder and water mixture, which is the object of the invention, avoids such blocking up.

BRIEF SUMMARY OF THE INVENTION

The process of the invention using running off of product from a reservoir above a moving conveyor is characterized by the fact that fresh product is introduced into the reservoir through a number of nozzles which discharge into the mass of the product in the reservoir. These nozzles are placed horizontally side by side and approximately horizontally oriented in the direction opposite to that of the running of the conveyor.

According to another characteristic, fresh product streams come into the product in the reservoir with such a force that they create agitation along closed flow lines in the product mass in the reservoir.

It is beneficial to make the distance between streams coming into the reservoir such that closed agitation circuits created by all streams join and encompass, in the plane containing the nozzles, the entire product mass.

Advantageously, the storage walls are vibrated. A reinforcement may be introduced into the product discharged from the reservoir and multiple layers of product may be discharged onto the conveyor.

The invention offers also a mechanism allowing for the implementation of the process. This mechanism, including a reservoir comprising a bottomless small trough placed over a moving conveyor and with an opening limited by said conveyor and by the lower rim of a plate forming the downstream wall of the trough, is characterized by the fact that said downstream plate is equipped with a number of product supply tubes, mounted outside of the trough, coming into the inside of the trough through the downstream plate.

The invention also includes means facilitating the introduction of a continuous reinforcement in manufactured board and which are adapted to this pouring facility.

The invention includes products which may be made by the process of the invention including plaster board having layers of different densities with or without a

DETAILED DESCRIPTION OF THE INVENTION

Figure 1:
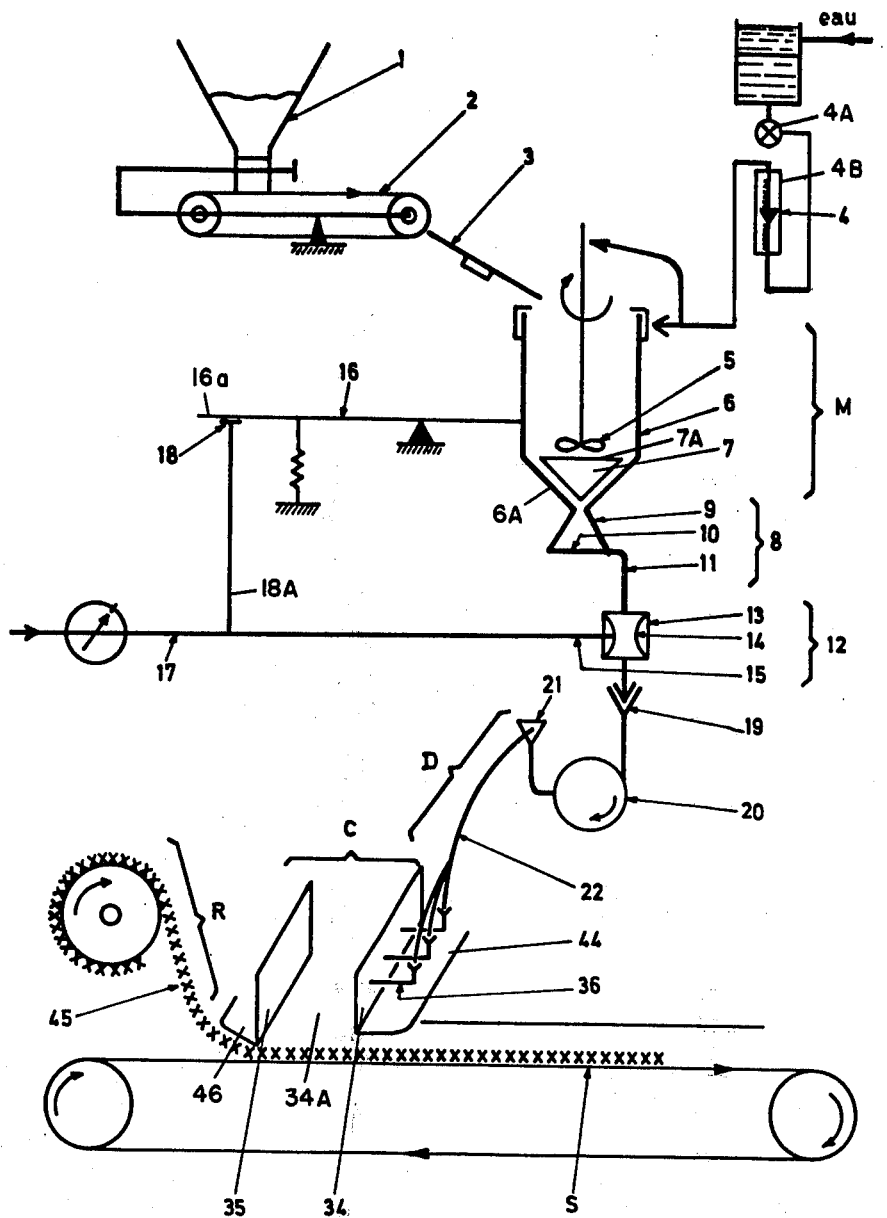
FIG. 1 is a diagrammatic drawing of a complete plaster board manufacturing line.

FIG. 1 shows a manufacturing facility for making plaster board building components reinforced for instance with fiber glass. This facility includes plaster and water mixture production means, and means which are objectives of the present application, making it possible to pour the mixture in a continuous process upon a moving conveyor and to eventually reinforce it.

Plaster powder contained in a hopper 1 is distributed on a weight-sensitive conveyor belt 2 set beforehand for a determined flow rate P of plaster powder and then brought to a vibrating pouring spout 3 through which it falls into a mixer M. A water feed regulator 4 having a valve 4A and a flow meter 4B introduces water in mixer M at flow rate W. Mixer M is a mixer with a turbine 5, cylindrical, vertical container 6, with a tapering lower section wall 6A. An intermediate trough bottom 7A is constituted by the top surface of a solid of revolution core 7, tapering downwardly and placed inside also tapering casing constituted by the container 6 lower section wall 6A. This core 7 is centered on the container 6 axis and its dimensions are such that a ring-shaped space remains around it between it and wall 6A to allow mixture runoff. In a certain type of construction, trough 6 lower section is conical and core 7 is a cone placed inside it, tip downward, its flat base forming the intermediate bottom. The mixture coming out of the mixer M is received in an ejection device 8 comprising a conical casing 9 placed with its tip upward and with a plane base 10. A collector pipe 11 comes out of ejector device 8 flush with base 10 tangentially to receiving container 9 and extends in the direction of rotation of mixer turbine 5. The mixture outcoming flow rate is regulated by a valve 12 mounted on collector pipe 11. This valve comprises a rigid cylindrical housing 13, an inner elastic sleeve 14 and a fluid intake pipe 15 in communication with the space between rigid housing 13 and sleeve 14. This fluid intake pipe 15 is connected to a fluid (generally air) supply; the fluid pressure is adjusted in order to bring about a desired compression of elastic sleeve 14 resulting in a certain closing setting of valve 12. In order to prevent any plaster deposit in the narrow channel created by the valve, a modulation of the fluid pressure controlling opening of said valve 12 is provided to constantly change the shape of sleeve 14.

It will be beneficial to provide this modulation with a regulating escape type pneumatic mechanism associated with a balance of force beam 16 supporting mixer M on one side, and on the other side gauging the escape of the pneumatic circuit supplying the valve, the escape taking place between beam end 16a and a nozzle 18 in a line 18A connected to pressure supply line 17 which is also connected to fluid intake line 15. Small motions of beam 16, induced by vibrations of mixer M resulting from turbine 5 motion, are picked up and transformed into signals through vibrations of beam 16 relative to nozzle 18. These vibrating signals modulate the regulating fluid pressure supplied to valve 12. This results in constantly varying the shape of elastic sleeve 14 of valve 12, which prevents any plaster stagnation and therefore any setting of the mixture in the narrow channel of the valve.

In order to have a continuous process production of a liquid plaster/water mixture, with a determined fluidity Fo, one proceeds as follows. First a mixture ratio Wo/Po giving a fluidity Fo is selected, Wo being water flow rate, Po being plaster powder flow rate, and is introduced into mixer M, Fo being a value expressed in mm (millimeters) given by F.L.S. test. This FLS test is frequently used by plaster manufacturers and it indicates plaster performance when poured. It consists in filling a hollow cylinder with a diameter of 60 mm (2.36 in.) and height of 59 mm (2.32 in.), placed vertically in the center of a polished metal or glass plate, with plaster mixed with water. At time t set in relation to time "to" of first contact between plaster and water, the cylinder is lifted thus freeing plaster which spreads on plate and forms a disc whose diameter is measured. The size of this diameter constitutes fluidity F parameter for time t.

Plaster powder and water supply flow rates in mixer M are set at Po and Wo. A time is selected of the stay To of mixed plaster in mixer M. The mixer outlet is closed. Turbine 5 of mixer M is set in motion. Water is introduced in mixer M at flow rate Wo for time To, and then plaster is introduced at flow rate Po also for a length of time To starting with the shutoff of water supply. Then after mixing, at the same time the mixer water supply is set at flow rate Wo, and the plaster powder supply is set at flow rate Po, and the mixer outlet is opened to allow the mixture to run off, valve 12 being set for a run off flow rate so that the amount of product in mixer trough remains constant. Valve control fluid pressure modulation is provided by vibrations from the mixer M. Thus, a permanent running range is reached. A liquid mixture of plaster powder and water with a set fluidity FLS, measured at t=1 minute 15 seconds, and which can be selected at a value as low as 120, can be used in the pouring facility of the invention to be described below. For more detail, reference may be had to our aforesaid copending applications.

Figure 2:
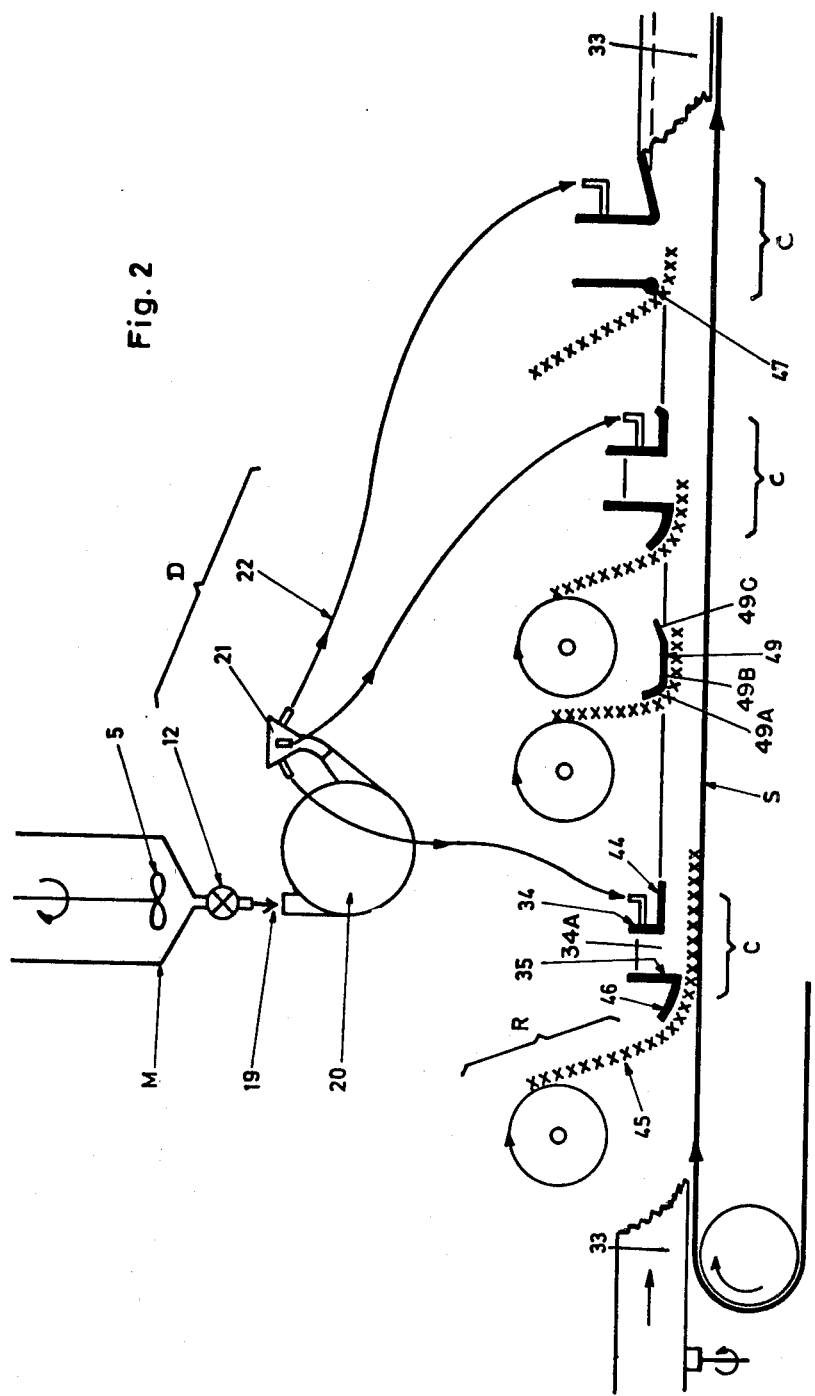
FIG. 2 is a sketch representation of plaster pouring apparatus.
Figure 3:
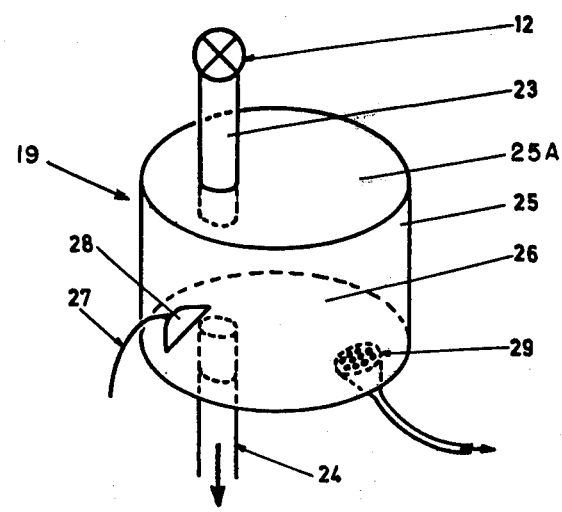
FIG. 3 is a view of a receiving container in which the mixture runs when coming out of the mixer.
Figure 4:
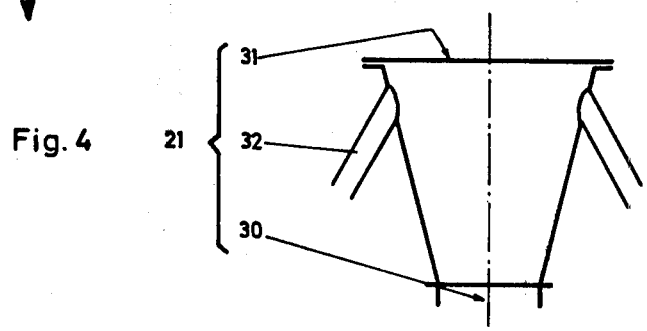
FIG. 4 is a multiple outlet distributor which distributes the mixture to several manufacturing lines or to various places on one line.
Figure 16:
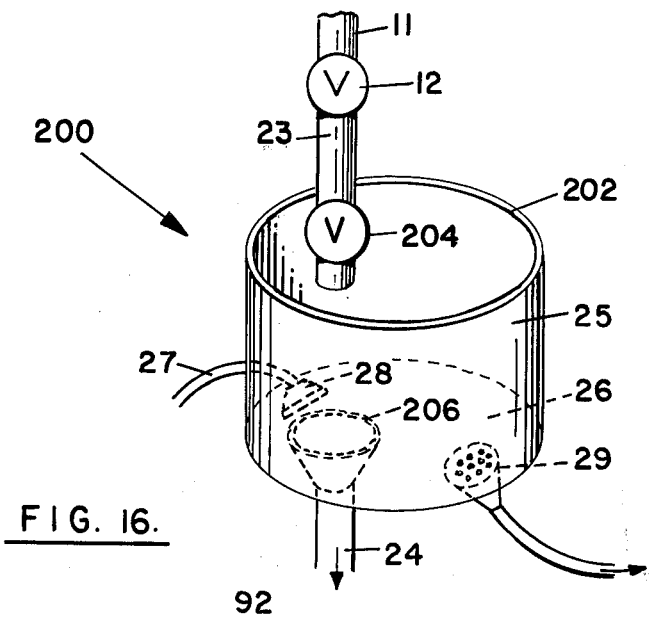
FIG. 16 is a view of an alternative embodiment of the receiving container of FIG. 3.

The continuous process pouring facility, shown as a whole in FIGS. 1 and 2 includes mixture distribution components D, a pouring head C which makes it possible to spread out the plaster on the moving conveyor, and reinforcement introduction means R. Mixture distribution components D, placed after valve 12 below mixer M, include a receiving container 19 constructed as shown in FIGS. 3 or 16, a pump 20, a distributor 21 constructed as shown in FIG. 4, and pipes 22 (FIG. 1). Receiving container 19 creates a load break at the output of valve 12 and isolates the mixer from the downstream part of the facility so as to make it possible to weigh said mixer free of apparatus downstream of tube 23. It is made with two vertical tubes 23 and 24, which are apart and placed on the same axis. Tube 23 passes freely through top 25A of case 25 and tube 24 forms a connection with bottom 26. The space between these two tubes 23 and 24 is enclosed in a case 25. Lower tube 24 penetrates into said case 24 above its bottom 26. A water intake pipe 27 ending in a spray nozzle 28 enters case 25 to wash out any plaster splashes. The lower part of bottom 26 of case 25 is provided with drain-off openings 29 for this wash water. Lower tube 24 brings the mixture to pump 20. Pump 20 is a pump able to operate without a load, capable of absorbing all flow from mixer M, compatible with a certain amount of accidental air circulation and capable of transmitting sufficient energy to the mixture in order to prevent mass setting inside the pipes in the system and able to work the load whatever it may be. Thus it will be convenient to use a rotative pump with gears or cams, or a plastic pipe pump, whose pipe is compressed by rollers or by an eccentric cam pushing the mixture out to said pump output openings.

Pump 20 may be directly connected with pouring head C through a pipe 22. However, inasmuch as several pouring heads C (FIG. 2) are supplied from one sole mixing unit and inasmuch as pump flow is always constant, a distributor 21 is placed at the outlet of pump 20 to regularize the flow and divide the mixture stream provided by pump 20 into many smaller and identical streams. Distributor 21 (FIG. 4) is funnel shaped, connected through its smaller end to the outlet of pump 20, and with its wider end closed by a cover 31, with radial outlet or distributor tubes 32 starting from the top section of funnel wall, near cover 31. Preferably, in order to obtain identical divided streams, distributor tubes 32 are arranged symmetrically relatively to the funnel axis and the distributor is mounted with its axis vertical. In order to allow for more space, distributor tubes 32 are slanted down. A pipe 22 is connected to each and every distributor tube 32 to bring the mixture to pouring head (or heads) C. A typical multiple outlet distributor 21 for a flow rate of 60 Kg/mn has a funnel having a top diameter of 40 mm and a bottom diameter of 14 mm, and has 4 outlets each of a diameter of 8 mm. These outlets are slanted at 15° to the vertical. The funnel is 40 mm high, and the outlet pipes are connected to the funnel at 10 mm lower than the enlarged top 31.

FIG. 1 shows in detail pouring head C mounted above conveyor S; pouring head C and pouring bed S moving in relation to one another. For convenience, it is preferable to keep pouring head C and all its supply pipes stationary, and hence conveyor S is a moving conveyor. Conveyor S is made from, for example, a stainless metal strip or a rubber strip. A pair of lateral strips 33 (FIG. 2) with same movement as conveyor S are mounted vertically on either side of conveyor S.

Pouring head C (FIG. 1) includes essentially two obstructing plates 34 and 35 forming, with conveyor S and lateral strips 33, a reservoir in the form of a small trough 34A placed transversely in relation to the direction of motion of conveyor S, plate 34 being the downstream one and plate 35 being an upstream counterplate, upstream and downstream being defined according to conveyor progress.

Figure 5:
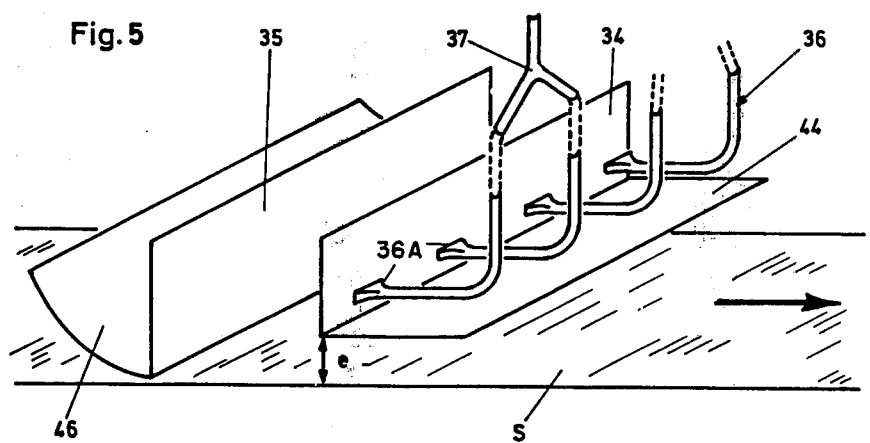
FIG. 5 is a pouring head.
Figure 6:
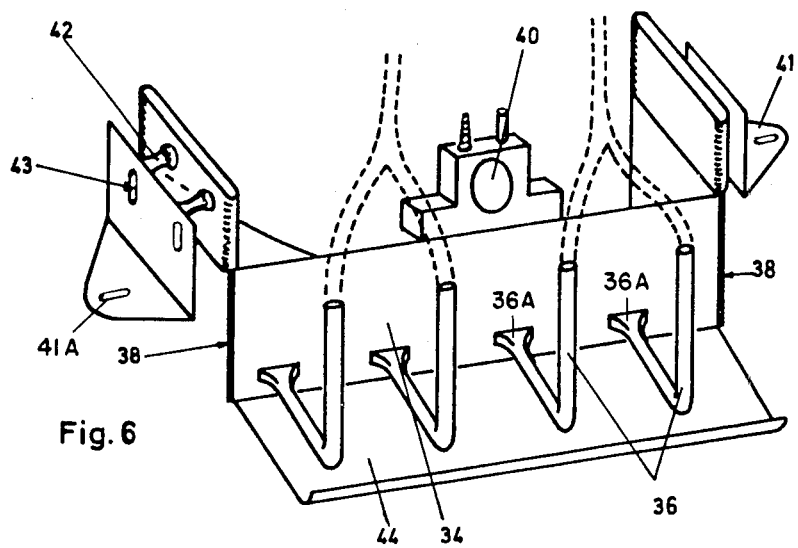
FIG. 6 shows the detail of a pouring head front plate.
Figure 7:
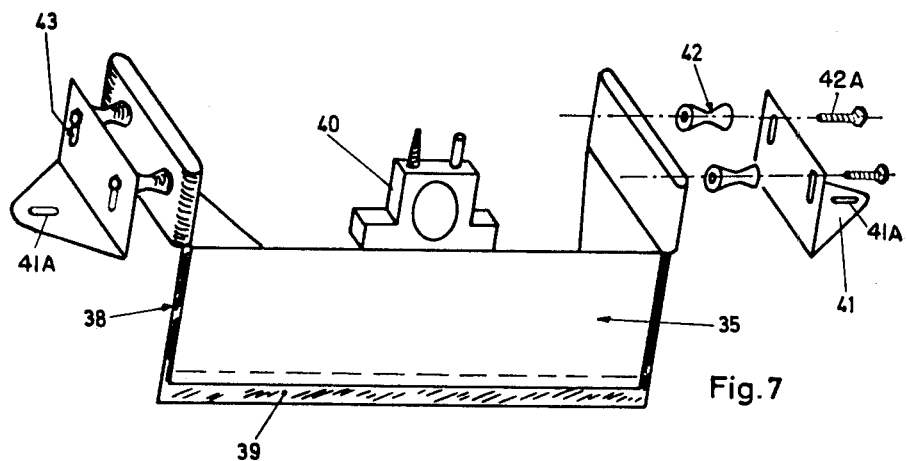
FIG. 7 shows the detail of a pouring head back plate.
Figure 8:
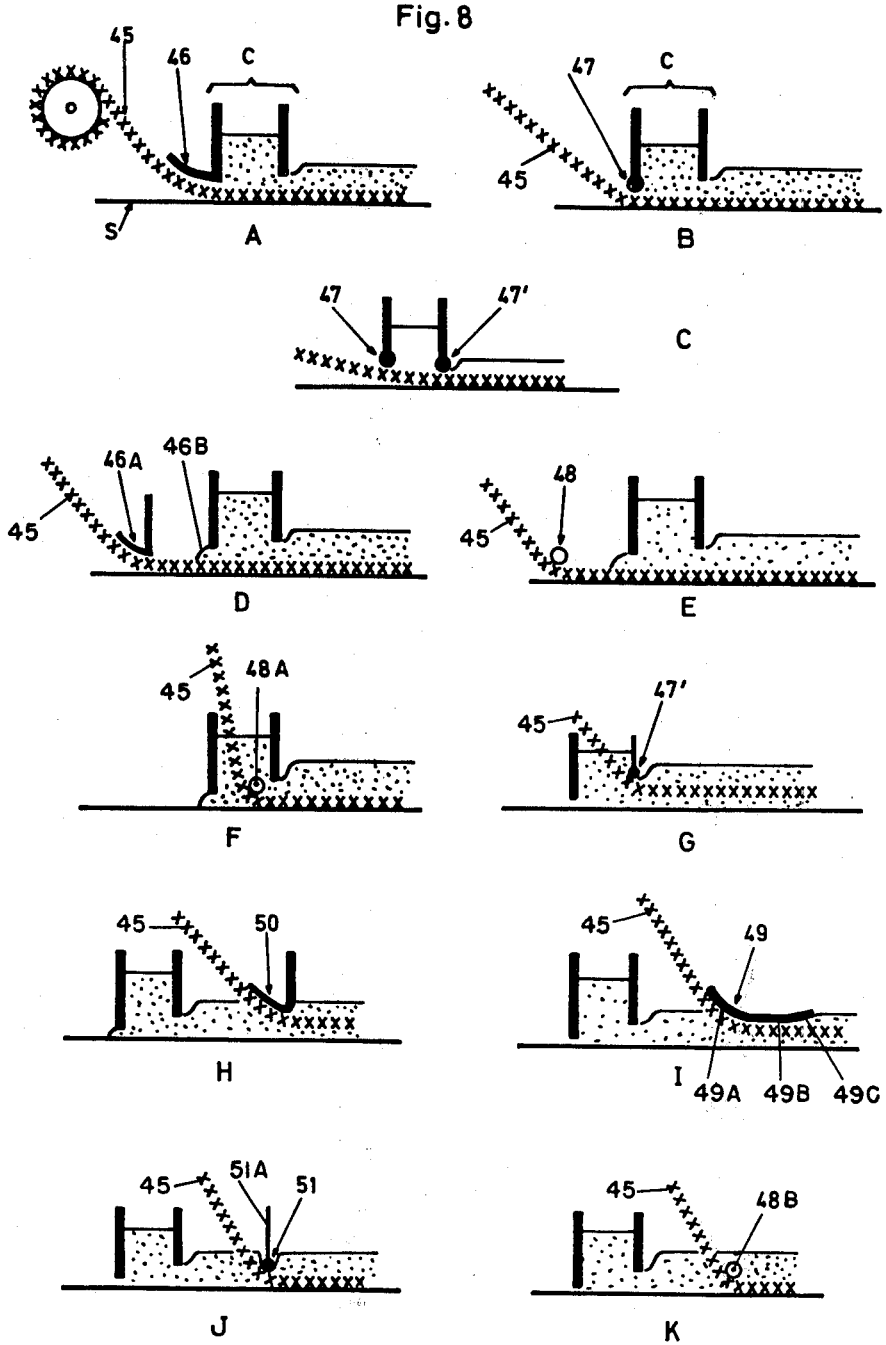
FIG. 8 shows various reinforcement placing modes.

Downstream plate 34 is equipped, on its outward face with a series of supply tubes 36 distributed along all its width and passing through it to open into small trough 34A. Each one of these supply tubes 36 is connected with a distributor tube 32, either one distributor tube 32 being connected with only one supply tube 36, or one distributor tube 32 linked through a Y connection 37 (FIG. 5) to two supply tubes. Two distributor tubes 32 may be linked with only one supply tube 36. Preferably, the supply tubes 36 should be horizontally flared as they pass through obstructing upstream plate 34 to form distribution nozzles 36A. The height at which tubes 36 reach downstream plate 34, and their spacing in regard to one another are functions of operating conditions: mixture flow rate, mixture fluidity, and level of mixture inside the trough; in the same way, the distance between both plates 34 and 35 are a function of operating conditions. Downstream plate 34 is raised in relation to conveyor S in order to provide a slit whose height, adjustable, is at most equal to the projected plaster run thickness. Both plates are provided with lateral rubber flaps 38, which touch moving lateral strips 33. Upstream plate 35 has a gasket 39 in its lower part in order to insure tightness with conveyor S. Each plate 34 and 35 has a vibrator 40 mounted on its top, for instance a pneumatic vibrator, creating a vibration vertically at a right angle to the direction of motion of conveyor S. Each of the two plates 34 or 35 is secured by machine screws (not shown) through two fixed lateral grooves 41A on clamps 41 mounted on general facility frame (not shown). Either plate 34 or 35 can be moved at will along these two retaining grooves, independently from each other. Plates 34 and 35 are secured to brackets 41 through vertical elongated openings 43 in brackets 41 by screws 42A with elastic stops 42 interposed between the plates and the brackets. Elongated holes 43 in the vertical portion of securing clamps 41 make it possible to adjust each of plates 34 and 35 in height. Downstream plate 34 may be fitted with a guide plate 44 (FIG. 5) approximately at right angles with plane of plate 34 outside of the small trough 34A constituted by both plates 34 and 35. Preferably this guide plate 44 is set at a low angle, about 7 degrees (°), divergent upwardly in relation with the direction of movement of conveyor S. Upstream plate 35 may be equipped with a reinforcement plate 46 (FIG. 5) making it possible to guide the introduction of a reinforcement 45 inside of or on top of plaster panels (FIG. 2). This plate 46 may be a flange (FIGS. 2 and 8A) on a slant mounted outside of the small trough, transversely in relation to conveyor S and linked with upstream obstructing plate 35 at the level of its lower rim. Thus, this guide 46 may be slanted about 45° in relation to conveyor S, depending on the reinforcement location in relation to obstructing plates. Reinforcement 45 could be available in rolls. Another way to facilitate the introduction of a reinforcement may comprise a rounded padding shown at 47 (FIG. 8B) covering the lower rim of upstream obstructing plate 35. An identical padding, shown at 47' on FIGS. 8C and 8G can be put on the lower rim of the downstream plate 34. One of independent reinforcement guides 46A, 48, 48A, 50, 49, 51 or 48 shown respectively in FIG. 8 at D, E, F, H, I, J and K respectively and not secured to the upstream plate 35 may be used. An independent guide, as the one shown at 49 in FIG. 2 and 8I may include a curved slanted upstream section 49A identical to guide 46 mounted on upstream plate 35 of a pouring head C, a horizontal part 49B and a guide portion 49C with a very narrow upward angle of about 7° in relation to conveyor S and identical to guide plate 44 of a pouring head C.

In the case of the embodiment of FIG. 8G, the reinforcement 45 is introduced tangentially to the rounded padding 47' and in this manner cleans it, thus keeping the opening between the padding 47' which forms the lower edge of the downstream plate and the conveyor constant.

Figure 9:
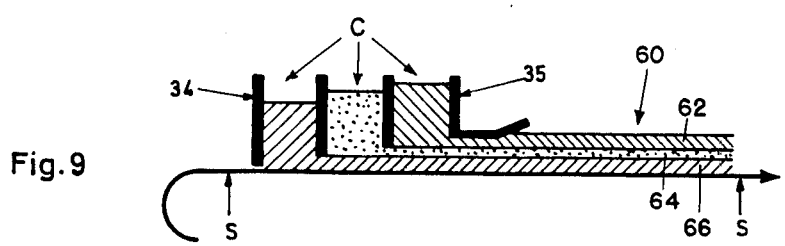
FIG. 9 illustrates a multiple pouring head.

An independent guide may be a sole slanted plate 50 (FIG. 8H), curved, identical to plate 46 mounted on back plate of a pouring head. An independent guide may also comprise a rounded padding 51 (FIG. 8J) parallel to the conveyor and at a right angle in relation to its direction of progress either mounted on a plate 51A whose plane is parallel with the one of pouring head C as shown in FIG. 8J, or by itself, made from a simple bar held at a distance from the conveyor equal to the height at which the introduction of the reinforcement within the manufactured products is desired as shown at 48, 48A and 48B in FIGS. 8E, 8F and 8K, respectively. Several guides of the above described types can be used at the same time to introduce several reinforcements at various levels into a plaster layer poured through one single pouring head. In addition, several pouring heads, with each of which one or several guides can be combined, can follow one another one on the same building panel manufacturing line; then, each pouring head C may be independent, as shown in FIG. 2, or on the contrary dependent on ones following it, as shown in FIG. 9, with the downstream plate of one pouring head constituting the upstream plate for the next head. Thus, it is possible to have one single pouring head C for building panels, or several successive pouring heads C each pouring a strip of a certain thickness, the first one directly on conveyor S, the next ones above the plaster strip already poured by the preceding head or heads.

The operation is as described below.

A fluid plaster mixture is obtained in mixer M, and its runnoff flow rate is regulated by regulating valve 12. The mixture runs off through receiving container 19. Spray nozzle 28 throws water in order to wash away any plaster splashes from inside receiving container 19. This wash water drains off through drain openings 29. Since lower tube 24 opening is above bottom 26 inside of case 25, this wash water cannot mix with the mixture and does not cause any alteration of mixture proportions. In order to facilitate starting operations of plaster mixture preparation station, a phase during which slight variations of plaster fluidity can be recorded, it may then be desirable to drain off mixture away from the manufacturing line to prevent any mass setting in any place on the said line where not scheduled. At that time, flexible tube 23 coming from valve 12 is taken out of container 19 and directed toward the outside and put back into place when fluidity has stabilized. In normal operation, the mixture having passed through receiving container 19 is introduced into pump 20. Pump 20 makes it possible to pump mixture up to various positions where it will be used, sometimes at distances of many tens of meters. Then, as the case may be, the mixture is either taken directly to a pouring head C, or sent to multiple outlet distributor 21. Inside distributor 21, the mixture runs first up to cover 31 and then it enters radial distributing tubes 32 evenly and continuously. The mixture passes through tubes 22 rapidly which prevents any mass setting inside said pipes and then it comes into supply tubes 36 where it is distributed into small through 34A delimited by plate 34, 35, conveyor S and lateral strips 33, arriving in the direction opposite to the direction of movement of conveyor S. Distributor 21 makes it possible to supply, from one single mixing station, with the same weight distribution, all the areas dependent from one pouring head whatever their width may be, makes it possible to split a single mixture stream into many smaller streams giving same total flow rate, makes it also possible to supply several pouring heads.

The mixture piles up in small trough 34A, thus creating a homogeneous storage load. Plaster streams coming through nozzles 36A of supply tubes 36 cross the trough, hit plate 35, are projected back and stream back toward downstream plate 34 and so on until they have exhausted their energy. Thus, they create vortices which stir up mixture and prevent formation of stagnant zones. The spacing between supply tubes 36, plaster incoming speed and the height at which said supply tubes 36 are mounted, must be selected or adjusted so that this circular motion inside of the trough between downstream plate 34 and upstream plate 35 is preferrably immersed in the mixture but nevertheless affects the surface of the mixture and so that each flow line creating a circular motion out of a supply tube 36 and induced by the back and forth motion be joined to the next circular motion line from the adjacent tube 36 with no stagnant zone between the two lines. Any lack of motion of plaster in any part of the trough would create a lack of homogeneity of mixture which would be detrimental to the quality of manufactured product, would favor a mass setting which would spread out, and would end up obstructing the whole of the pouring head.

Nozzles 36A of supply tubes 36 are flared horizontally so that streams coming out of them provide a stirring distributed over a wider area, so that depth of stirring is limited, and so that splashing is prevented. The watertightness of upstream plate 35 combined with conveyor S in motion is achieved with gasket 39, but it is beneficial, in order to prevent formation of stagnant zones in small trough corners close to said plate to allow for a slight leak underneath the plate. Thus a round fold forms in the back, which constantly forms again owing to continuous pouring bed progress, which contributes to perfecting of watertightness. Such a fold is shown at 46B in FIG. 8D. Downstream obstructing plate 34 is raised on loosening screws 42A securing it to clamps 41 in order to provide between it and conveyor S a slit of height e. The stationary load upstream from the obstruction provided by plate 34, causes the mixture to spread on conveyor S through the slit thus created.

In the case of small thickness panels, it is preferable to use plate 44; said plate 44 then facilitates retention of the load inside of trough 34A and prevents, when the level in said trough is very low, stirring which takes place therein from spreading to the downstream side of plate 34. It is beneficial, in order to prevent plaster from forming deposits or from mass setting on plates 34, 35 to subject them to vertical vibrations at right angles with conveyor S with vibrators 40.

For the adjustment of a pouring head C, the procedure is as follows. For a given speed of conveyor, the dimensions of the board to be manufactured determine the amount of mixture to be supplied by the mixing station and to be poured on conveyor S, and therefore the total rate of flow at the outlet of supply tubes 36, as they discharge into trough 34A. The section of each supply tube 36, size of nozzles 36A, number of supply tubes 36 and of pipes 22 are selected in order to obtain a speed, in said tubes and pipes, which does not allow deposits, i.e., in the case of plaster, a speed above 10 centimeters (3.94 inches) per second (cm/s) (in./sec.). The mixture is received into the trough 34A. Slit height e is provided under downstream plate 34 and the distance between upstream plate 35 and downstream plate 34 is adjusted in order to achieve a constant level in the trough, a satisfactory agitation, and the immersion of the tubes 36 in the mixture in the trough. Agitation of the mixture in the corners of upstream plate 35 is achieved by raising slightly said plate in order to create a round fold about 5 centimeters (2 inches) long at its middle.

The table below gives, by way of example, two series of operating parameters for a pouring head.

sities and/or with different finely split or chopped reinforcement fibers, which are introduced at the mixing time.

One or several reinforcements 45 may be introduced in manufactured boards at various levels in their body and at various positions on the manufacturing line. Under the term reinforcement, we define all materials which can be set inside of boards or on their surface, whether they actually serve as reinforcement to increase said boards resistance to applied forces or whether they constitute either decorative or protective lagging. Not only may strip or continuous reinforcement be introduced, but also other non-continuous reinforcements, such as chopped or finely split fibers, may be introduced. Exemplary reinforcements are paper, cardboard, metallic film such as aluminum sheet, glass cloth, fabrics, non-woven organic materials, continuous threads, for example, of glass or wires, continuous thread sheets intermixed with glass, layers of crisscrossed continuous glass threads, or others. These reinforcements may be introduced upstream from a pouring head using independent guides as shown in FIGS. 8D and 8E. For instance, reinforcement material 45 supplied in rolls is stretched up to a guide, passed between said guide and conveyor S and placed underneath pouring head C. As it is caught in the plaster it is drawn away, and a continuous pulling is exerted on the roll which thus unwinds at manufacturing line speed. In this way a reinforcement can be placed, either on the bottom face of the manufactured board panel by securing the guide very close to the conveyor, or in the body of the board by securing the guide at a distance from the conveyor equal to the height at which the reinforcement is scheduled to be placed in the board, the distance being, however, not exceeding the smallest height at which upstream plate 35 and downstream plate 34 have been raised in relation to the conveyor. Several rein-

|  | Example 1 | Example 2 |
|---|---|---|
| Speed of conveyor in meters (feet) per minute | 2.50 (8.22) | 2.50 (8.22) |
| Mixture FLS in millimeters (inches) | 230 (9) | 230 (9) |
| Pouring head supply tubes diameter mm. (in.) | 8 (.3) | 10 (.39) |
| Number of supply tubes per head | 4 | 4 |
| Width and height of discharge opening of supply tube nozzles | 12  4 | 15  5 |
| Spacing of outlets through the front plate, mm (in.) | 83-150-150-150-83 (3.27)    (5.91) | 83-150-150-150-83 |
| Height above conveyor at which these outlets are placed mm (in.) | 13 (.51) | 17 (.66) |
| Pouring head width mm (in.) | 616 (24.25) | 616 (24.25) |
| Distance between upstream plate and downstream plate mm (in.) | 90 (3.54) | 110 (4.33) |
| Mixture height in small trough mm (in.) | 15 (.59) | 20 (.79) |
| Height of round fold under back plate mm (in.) | 2.5 (.098) | 2.5 (.098) |
| Pouring slit e height mm (in.) above conveyor | 4 (.15) | 8 (.31) |
| Thickness of panels thus manufactured mm (in.) | 5 (.20) | 10 (.39) |

When there is a succession of pouring heads, as shown in FIG. 2, they are adjusted separately and in the same way, inasmuch as they are independent.

With the pouring heads joined to one another, as shown in FIG. 9, the most upstream pouring head is adjusted first, and then the next pouring head, the pouring slit height for one head being at the same time the round fold height for the next head, in this manner building a component 60 of, for example, a plaster board having layers 62, 64 and 66 of the same or different densities. When several pouring heads C follow one another, they may all be supplied with same product or supplied with plaster mixtures of various different denforcements can similarly be introduced at various heights with several independent guides set upstream from a pouring head. Also, reinforcements may be placed on the bottom face of the board or in its body by guiding them through guides 46 and 47 secured on upstream plate 35 as shown in FIGS. 8A and 8B, the height of the reinforcement in the body of the board being, however, limited by the pouring slit height underneath the downstream plate. A guide 47′ (FIG. 8C) may also be secured to downstream plate 34 and then the reinforcement height is determined by the slit height underneath downstream plate 34.

Reinforcement may also be introduced inside of the trough between downstream 34 and upstream 35 plates. Reinforcement height can then be determined through bar shaped guide 48 as shown in FIG. 8F or through round padding 47' set on the downstream plate (FIG. 8G). A reinforcement introduced through this process must be the most pervious possible to plaster in order to least interfere with agitation inside of the trough.

Reinforcement may also be introduced after the plaster layer has been poured, either on the surface or in the body of the plaster, through an independent guide 50, 49, 51 or 48B set downstream from the pouring head as shown respectively in FIGS. 8H, I, J, K. When the reinforcement is set on the surface of a layer, it can be either porous or watertight to the plaster fluid mixture. When it is set in a plaster layer mass, it would be preferable for it to be porous to allow the fluid mixture to permeate through it to prevent the reinforced board from tending to split along the reinforcement plane. Layers of criss-crossed continuous wires or threads may be used, in order to provide for a satisfactory distribution of reinforcement throughout the plaster mass of the board, a good cohesiveness between plaster and reinforcement, and for the reinforcement to be easily passed through by plaster at the time of its placement.

Once poured, the plaster strip progresses on the conveyor S, framed in by lateral strips 33, until the plaster has set sufficiently to be handled and cut up. Then the strip passes to another conveyor. Conveyor S and lateral strips 33 are washed off during their return travel.

As already known, it will be possible to intervene on various plaster reaction phases by adding either before or after pouring setting delaying or accelerating agents. The temperature of conveyor S can also be acted upon.

Figure 20:
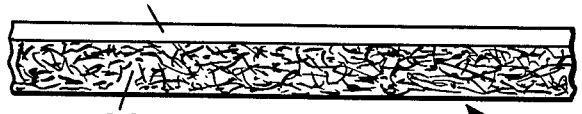
FIG. 20 is a view in side elevation of plaster board attached to a glass wool insulating pad.

Products manufactured by the above described process and apparatus may be plaster alone, or plaster reinforced by glass fiber, for instance; they may be used by themselves or be combined with other materials to be used as a covering layer or as ornamental plates. They can be made into thin plaster panels less than 3 mm (0.118 in.) thick reinforced with or without continuous fiber glass, or made into thicker panels with a reinforcement to improve resistance, or made without any reinforcement, and may be covered or not with lagging. It is possible to pour a very thin plaster film down to about one millimeter (0.039 in.) thick to be used to cover the bottom and sides of ceiling panels made of fiberglass. In that case, it is possible to place upon the plaster film just poured a glass wool strip just downstream from the pouring head, the plaster itself providing for linkage with the glass wool at the time of setting, or the glass wool itself can be the pouring bed. Such a board 90 is shown in FIG. 20 and includes a plaster board sheet 92 attached to a glass wool pad 94.

Plaster boards thicker than one centimeter (0.39 in.) may be used as ornamental boards to build sheath partitions. Up to now such partitions were made with a glass wool board with an asphalt agglomerated paper vapor barrier and a reinforced plaster plate with a cardboard top layer. From now on, as an application of the invention process, a partition can be made with a glass wool panel without a vapor barrier and thus without any asphalt and a plaster plate reinforced with fiber glass without any cardboard top layer, the junction between the glass wool and plaster being provided through gluing or preferably by the plaster itself fastened to the glass fibers during its setting. Such sheath partitions offer improved fire-retardant properties compared to older partitions because they eliminate the paper cover sheets which are a fire hazard. The invention process and apparatus make it possible not only to pour plaster, but also other evolutive products, i.e., products with changing physical or chemical properties, and all non-evolutive products such as cement.

Figure 10:
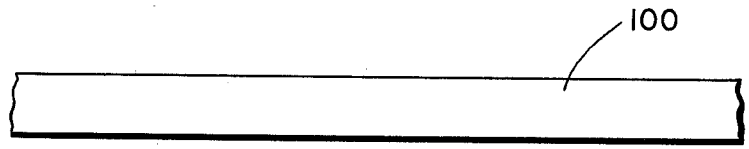
FIG. 10 is a side elevation partially broken away of a plaster board of the invention.

A completed plaster board panel 100 made using the process and apparatus described above is shown in FIG. 10 and is suitable, for example, for use in building construction.

Figure 11:
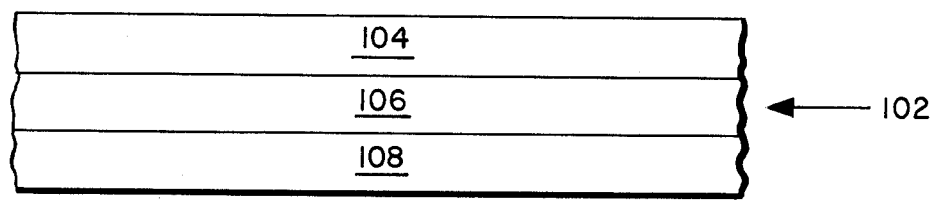
FIG. 11 is a side elevation partially broken away of a plaster board of the invention having three layers of different densities.

As shown in FIG. 11, a plaster board 102 has layers 104, 106 and 108 with each layer having a density different from the densities of the other two layers. Thus, for example, the densities of layers 104, 106 and 108 may be 1000 kg/m$^3$, 200 kg/m$^3$, and 800 kg/m$^3$, respectively, the densities may be regulated between 150 kg/m$^3$ to 2000 kg/m$^3$ by adding a forming agent as known in the prior art.

Figure 12:
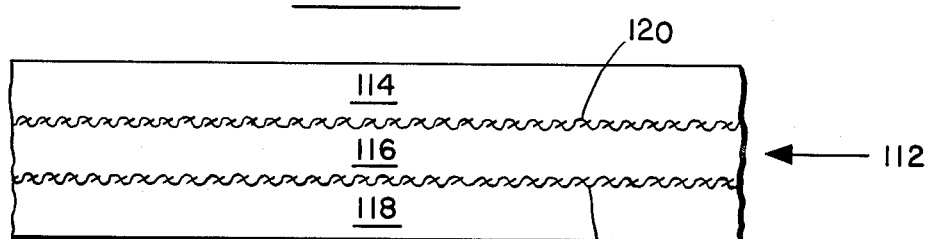
FIG. 12 is a side elevation partially broken away of a plaster board of the invention having three layers of different densities and reinforcement between adjacent layers.

Referring to FIG. 12, a plaster board 112 has layers 114, 116 and 118. Each layer has a density different from either of the two layers, for example, layers 114, 116 and 118 having densities of 800 kg/m$^3$, 300 kg/m$^3$, and 900 kg/m$^3$, respectively. A fabric reinforcement sheet 120 lies between layers 114 and 116. Similarly, a fabric reinforcement sheet 122 lies between layers 116 and 118. Sheets 120 and 122 are sufficiently porous so that plaster can penetrate the interstices between the threads forming the fabrics.

Figure 13:
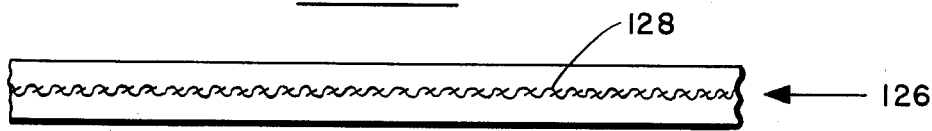
FIG. 13 is a side elevation partially broken away of a plaster board in accordance with the invention having a reinforcement embedded therein.

A plaster board 126 shown in FIG. 13 has embedded in the central portion thereof a fabric reinforcement sheet 128 of, for example, fiberglass.

Figure 14:
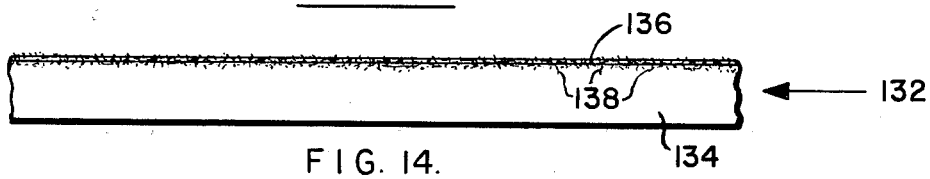
FIG. 14 is a side elevation partially broken away of a plaster board in accordance with the invention having a panel of glass wool fibers secured to one face of a plaster board.

Referring now to FIG. 14, a panel 132 comprises a plaster board 134 and a fiberglass mat facing 136 on said board with the fibers 138 of mat 136 embedded in board 134 and shown on an enlarged scale.

Figure 15:
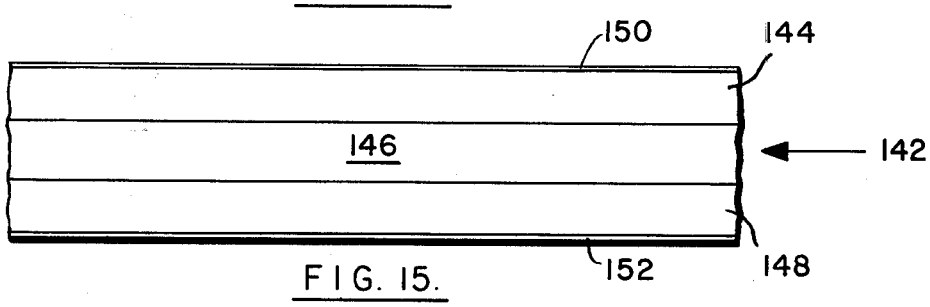
FIG. 15 is a side view partially broken away of a three layer reinforced plaster board in accordance with the invention.

In FIG. 15, there is shown a plaster board 142 having layers 144, 146 and 148 of plaster with layers 144 and 148 being reinforced by thin sheets of aluminum 150 and 152 respectively.

All of the foregoing and numerous variations thereof are readily made using the apparatus and process described above and are useful, for example, as building elements.

A preferred receiving container 200 which can be substituted for receiving container 19 is shown in FIG. 16. Container 200 has an open top 202 and receives discharge from tube 23 which has a valve 204 used to shut off flow from the mixer M during the start up operation, permitting the setting of valve 12 to remain undisturbed from the previous operation if manually operated or to remain connected to automatic valve setting means responsive, for example, to the weight of the mixer M. The receiving container 200, being physically disconnected from mixer M while providing for continuity of flow, permits mixer M to be weighed so as to determine the amount of material contained therein.

In the embodiment of FIG. 16 tube 24 has a funnel 206 connected to its upper end to collect the discharge from tube 23. Funnel 206 insures the collection of any portions of the stream discharging from tube 23 which expand beyond the diameter of tube 23 when discharged.

Figure 17:
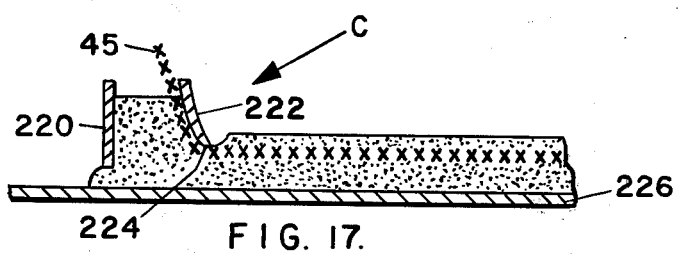
FIG. 17 shows another reinforcement placing mode.

As shown in FIG. 17, pouring head 3 has a vertical upstream plate 220 and a curved downstream plate 222 having a rounded bottom edge 224 against which runs reinforcement 45 to keep plate 222 clean including bottom edge 224 and to keep the distance between plate 222 and conveyor 226 constant.

Figure 18:
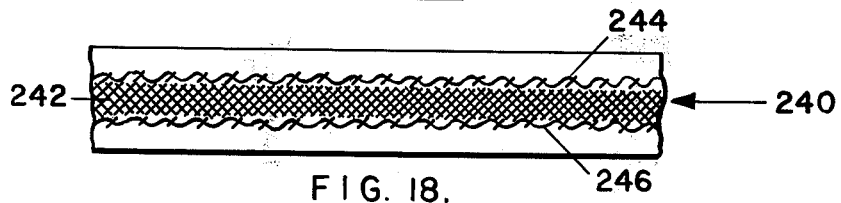
FIG. 18 is a side elevation partly broken away of a plaster board reinforced by a continuous filament mat encased between two layers of glass fiber netting.

As shown in FIG. 18, a desirable plaster board 240 has a reinforcement layer of continuous filament mat 242 with layers of glass fiber netting 244 and 246 above and below, respectively, to confine the layer 242 and restrain it from spreading apart. This plaster board is advantageous because the mat 242 makes the board very strong.

Figure 19:
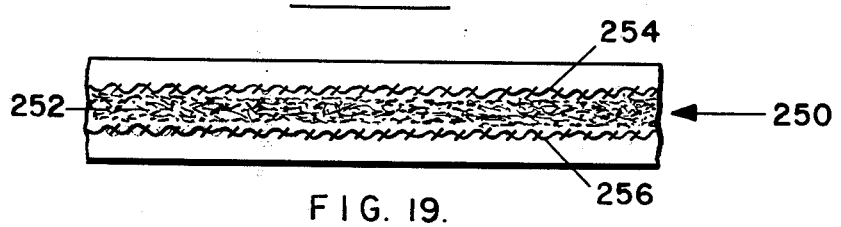
FIG. 19 shows a plaster board with a reinforced layer of chopped glass fibers.

As shown in FIG. 19, a plasterboard 250 has a reinforcement layer of chopped glass fibers 252 between an upper glass fiber netting layer 254 and a lower glass fiber netting layer 256. This board is advantageous because the chopped fibers are less expensive than mat 242 and yet give the board 250 great strength. The netting 254 and 256 confine the glass fibers 252 and prevent them from escaping from the board and from extending sideways from the side edges of the board 250. This is very important, especially for thin board.

We claim:

1. A process for making a board from a fluid evolutive product including pouring said product into a reservoir located above a conveyor moving at a uniform speed, passing said product through a slit transverse to the conveyor so that the board is formed between the conveyor and the downstream wall of the reservoir, characterized by continuously introducing streams of fresh fluid evolutive product substantially horizontally into the reservoir through spaced nozzles discharging into the product in the reservior with such force as to eliminate dead spots and prevent premature hardening of said product.

2. A process according to claim 1, characterized in that the nozzles are mounted side by side horizontally and directed approximately horizontally in the direction opposite to the direction of pouring bed travel.

3. A process according to claim 1 characterized in that the slit height is at most equal to the board thickness.

4. A process according to claim 1 characterized in that the fresh product streams create in the storage product in the reservoir agitation along flow lines going back and forth.

5. A process according to claim 4, characterized in that the agitation flow lines combine with one another and spread substantially in the plane containing the nozzles to throughout the product.

6. A process according to claim 4, characterized in that the height at which the streams enter the product in the reservoir is such that flow lines reach the upper open surface of the product in the reservoir.

7. A process according to claim 1, characterized by the fact that fluid evolutive product contained in the reservoir has an FLS fluidity above 120.

8. A process according to claim 1, characterized in that the reservoir walls are subjected to vibrations.

9. A process according to claim 8, characterized in that the vibrations to which the storage walls are subjected are vertical and at a right angle to the direction of movement of the conveyor.

10. A process according to claim 1, characterized in that the reservoir upstream wall is raised from the conveyor, and forming a round fold of product behind said wall.

11. A process according to claim 10, characterized in that at least one reinforcement is introduced underneath the reservoir upstream wall, said reinforcement being then carried away by the poured product on the conveyor.

12. A process according to claim 11, characterized in that the reinforcement is introduced in contact with the reservoir upstream wall with said wall being raised from the conveyor a distance equal to the height at which said reinforcement is placed in the body of said board.

13. A process according to claim 11, characterized in that the reinforcement is introduced in contact with the reservoir downstream wall with the slit height underneath said wall being set at the height at which said reinforcement is placed in the body of said board and the reservoir downstream wall is set at a height at least equal to the height of the upstream wall.

14. A process according to claim 11, characterized in that the reinforcement is introduced into a round fold of the product behind the reservoir at a distance from the conveyor equal to the height at which said reinforcement is placed in the body of said board with the reservoir downstream and upstream walls being raised away from the reservoir distances at least equal to said first mentioned height.

15. A process according to claim 14, characterized in that at least one reinforcement is brought into the product in the reservoir between its upstream wall and its downstream wall, introduced through the slit, and carried away by poured product in the direction of conveyor travel.

16. A process in accordance with claim 15 characterized in that one reinforcement is introduced tangentially to at least the bottom edge of the downstream wall to clean the downstream wall.

17. A process according to claim 15, characterized in that the reinforcement is maintained in contact with the reservoir downstream wall and the slit height being set equal to the height at which said reinforcement is placed in the body of said board.

18. A process according to claim 15, characterized in that the reinforcement is placed inside of the reservoir at a distance from the conveyor corresponding with the height at which it is placed in the body of said board with the slit height being set to be at least equal to said first mentioned height.

19. A process according to claim 18, characterized in that a reinforcement is introduced into the poured product layer by setting said reinforcement on the top surface of said poured layer and pushing it down into the body of said layer to a predetermined height in said layer, said reinforcement being carried away by the poured product layer in the direction of conveyor travel.

20. A process according to claim 1, characterized in that several product layers are successively poured on the same conveyor, the first one directly on the conveyor with each following one being poured on the immediately previously poured layer.

21. A process according to claim 1, characterized in that the evolutive pulp is plaster and water.

22. A process according to claim 20, characterized in that at least one layer is reinforced.

23. A process for making a board from a fluid evolutive product including pouring said product into a reservoir located above a conveyor moving at a uniform speed through a slit transverse to the conveyor so that the board is formed between the conveyor and the downstream wall of the reservoir characterized by continuously agitating the fluid evolutive product in the reservoir by continuously introducing streams of fluid evolutive product substantially horizontally into the product in the reservoir with such force as to eliminate dead spots.

24. The process of claim 23 characterized in that the streams are introduced in a direction opposite to the direction of travel of the conveyor.

25. The process of claims 23 or 24 characterized in that the streams are substantially parallel to each other.

26. A continuous process of making plaster board comprising the steps of
   pouring a supply of plaster powder at a constant rate into a mixing tank,
   pouring a quantity of water into the mixing tank at a constant rate,
   directing a portion of the water along the walls of the tank to flush it and keep it clean,
   directing a portion of the water at the shaft of a turbine to flush it and keep it clean,
   mixing the plaster powder and water with the impeller of the turbine and throwing the mixture outwardly to create a single vortex about a vertical center line,
   mixing the plaster powder in the tank for a time in the range of 15 to 30 seconds,
   discharging the mixture from the bottom of the tank into an ejection device,
   discharging the mixture from the bottom of the ejection device in a tangential manner,
   passing the mixture into a valve having an elastic sleeve forming an orifice,
   sensing the level of the mixture in the tank by weighing the tank and mixture,
   controlling the size of the valve orifice in accordance with the tank mixture level in order to maintain that level and the time of the mixture in the tank,
   vibrating the valve sleeve to prevent deposit of mixture thereon,
   passing the mixture to a distributor,
   distributing the mixture from the distributor to a number of nozzles,
   ejecting the mixture through the nozzles into a trough of the mixture and spreading the mixture transversely,
   creating a number of horizontal vortices to spread the mixture laterally in the trough and prevent any dead spots and deposit of the mixture,
   moving the mixture horizontally on a moving conveyor through at slit to form a flat sheet,
   reinforcing the mixture by adding reinforcement material to the mixture before it sets, and
   allowing the mixture to set to form plaster board.

27. A process for making a board from a fluid evolutive product including
   pouring said product into a reservoir above a conveyor moving at a uniform speed through a slit transverse to the conveyor so that the board is formed between the conveyor and the downstream wall of the reservoir, characterized in that
   streams of fresh fluid evolutive product are introduced continuously into the reservoir through spaced nozzles discharging into the product in the reservoir,
   said streams being introduced horizontally and with such force as to create agitation along closed flow lines and to eliminate dead spots in the product in the reservoir.

* * * * *